United States Patent
Park et al.

(10) Patent No.: US 12,528,072 B2
(45) Date of Patent: Jan. 20, 2026

(54) METHOD FOR PREPARING SUPER ABSORBENT POLYMER

(71) Applicant: LG Chem, Ltd., Seoul (KR)

(72) Inventors: Sung Soo Park, Daejeon (KR);
Heechang Woo, Daejeon (KR);
Gicheul Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 709 days.

(21) Appl. No.: 17/909,901

(22) PCT Filed: Dec. 23, 2021

(86) PCT No.: PCT/KR2021/019711
§ 371 (c)(1),
(2) Date: Sep. 7, 2022

(87) PCT Pub. No.: WO2022/139505
PCT Pub. Date: Jun. 30, 2022

(65) Prior Publication Data
US 2023/0124243 A1 Apr. 20, 2023

(30) Foreign Application Priority Data

Dec. 24, 2020 (KR) .................. 10-2020-0183356
Dec. 22, 2021 (KR) .................. 10-2021-0185042

(51) Int. Cl.
*B01J 20/00* (2006.01)
*B01J 20/26* (2006.01)
(Continued)

(52) U.S. Cl.
CPC ......... *B01J 20/267* (2013.01); *B01J 20/3282* (2013.01); *C08F 220/06* (2013.01);
(Continued)

(58) Field of Classification Search
CPC .................. B01J 20/267; B01J 20/3282; B01J 2220/68; C08F 220/06; C08J 3/12; C08J 3/245; C08J 2333/02
(Continued)

(56) References Cited

U.S. PATENT DOCUMENTS 5,064,582 A 11/1991 Sutton et al.
2016/0318002 A1 11/2016 Lee et al.
(Continued)

FOREIGN PATENT DOCUMENTS

CN 105916902 A 8/2016
CN 106164099 A 11/2016
(Continued)

OTHER PUBLICATIONS

Schwalm, Reinhold, "UV Coatings: Basics, Recent Developments and New Applications", Elsevier Science (Dec. 2006). 3 pgs.
(Continued)

*Primary Examiner* — James E Mcdonough
(74) *Attorney, Agent, or Firm* — Lerner David LLP (57) ABSTRACT

The present disclosure relates to a method for preparing a super absorbent polymer. More specifically, it relates to a method for preparing a super absorbent polymer capable of improving drying efficiency, reducing a generation amount of re-fines, and simultaneously improving absorption performance, in particular, absorption under pressure and permeability of the finally prepared super absorbent polymer by controlling granulation strength of the extruded fine reassembly.

12 Claims, 3 Drawing Sheets

(51) Int. Cl.
*B01J 20/32* (2006.01)
*C08F 220/06* (2006.01)
*C08J 3/12* (2006.01)
*C08J 3/24* (2006.01)

(52) U.S. Cl.
CPC .............. *C08J 3/12* (2013.01); *C08J 3/245* (2013.01); *B01J 2220/68* (2013.01); *C08J 2333/02* (2013.01)

(58) Field of Classification Search
USPC .......................................................... 502/402
See application file for complete search history.

(56) References Cited

U.S. PATENT DOCUMENTS

| | | |
|---|---|---|
| 2017/0015798 A1 | 1/2017 | Lee et al. |
| 2017/0166707 A1 | 6/2017 | Jang et al. |
| 2017/0233534 A1 | 8/2017 | Kim et al. |
| 2018/0237594 A1 | 8/2018 | Lee et al. |
| 2018/0265653 A1 | 9/2018 | Lee et al. |
| 2020/0247958 A1 | 8/2020 | Park et al. |
| 2021/0102031 A1 | 4/2021 | Lim et al. |

FOREIGN PATENT DOCUMENTS

| | | | | |
|---|---|---|---|---|
| CN | 106661235 A | 5/2017 | | |
| CN | 106795253 A | 5/2017 | | |
| CN | 108137725 A | 6/2018 | | |
| CN | 110278712 A | 9/2019 | | |
| EP | 0417761 A2 | 3/1991 | | |
| EP | 3564295 A1 | 11/2019 | | |
| JP | H03152104 A | 6/1991 | | |
| JP | 10113557 A | * | 5/1998 | |
| JP | H10113557 A | 5/1998 | | |
| JP | 2004067878 A | 3/2004 | | |
| JP | 2008526502 A | 7/2008 | | |
| JP | 5064032 B2 | 10/2012 | | |
| JP | 2020507635 A | 3/2020 | | |
| KR | 20150143167 A | 12/2015 | | |
| KR | 20160063975 A | 6/2016 | | |
| KR | 20160144902 A | * | 12/2016 | ............... C08J 5/12 |
| KR | 20170053415 A | 5/2017 | | |
| KR | 101848470 B1 | 4/2018 | | |
| KR | 20190076715 A | 7/2019 | | |
| KR | 20190087209 A | 7/2019 | | |
| KR | 20200088664 A | 7/2020 | | |
| WO | 2006078046 A2 | 7/2006 | | |
| WO | 2006101271 A1 | 9/2006 | | |

OTHER PUBLICATIONS

Odian, George, "Principles of polymerization", 2nd ed., Wiley-Interscience New York, Oct. 1981.3 pgs.

Buchholz, Fredric L. and Andrew T. Graham. "Modern Superabsorbent Polymer Technology", Wiley-VCH, 1998 p. 161. 3 pgs.

International Search Report for PCT/KR2021/019711 mailed Apr. 5, 2022. 3 pgs.

Extended European Search Report including Written Opinion for Application No. 21911571.4 dated Jul. 25, 2023, pp. 1-8.

* cited by examiner

METHOD FOR PREPARING SUPER ABSORBENT POLYMER

CROSS-REFERENCE TO RELATED APPLICATION

The present application is a national phase entry under 35 U.S.C. § 371 of International Application No. PCT/KR2021/019711, filed on Dec. 23, 2021, which claims priority to Korean Patent Application No. 10-2020-0183356, filed on Dec. 24, 2020, and Korean Patent Application No. 10-2021-0185042, filed on Dec. 22, 2021, the disclosures of which are incorporated herein by reference in their entirety.

TECHNICAL FIELD

The present disclosure relates to a method for preparing a super absorbent polymer. More specifically, it relates to a method for preparing a super absorbent polymer capable of improving drying efficiency, reducing a generation amount of re-fines, and simultaneously improving absorption performance, in particular, absorption under pressure and permeability of the finally prepared super absorbent polymer by controlling granulation strength of the extruded fine reassembly.

BACKGROUND OF ART

A super absorbent polymer (SAP) is a type of synthetic polymeric material capable of absorbing 500 to 1000 times its own weight of moisture. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

An absorption mechanism of the super absorbent polymer is governed by interaction of penetration pressure due to the difference in electrical attraction caused by charges of a polymer electrolyte, affinity between water and a polymer electrolyte, molecular expansion due to repulsion between polymer electrolyte ions, and inhibition of expansion due to cross-linking. In other words, water absorbency of the super absorbent polymer depends on the affinity and molecular expansion, and an absorption rate is largely dependent on the osmotic pressure of the absorbent polymer itself.

Meanwhile, particles having a particle diameter of 150 (m or less, which are inevitably generated in the preparation of a super absorbent polymer, are called fines, and it is known that the fines are generated in an amount of about 20 to 30% in the pulverization or transfer process during the preparation of a super absorbent polymer. When such fines are included in the super absorbent polymer, they may cause a reduction in main physical properties of the super absorbent polymer such as absorption under pressure or water permeability. For this reason, during the preparation of a super absorbent polymer, particularly in a classification process, the fines are separated to produce the super absorbent polymer only with the remaining polymer particles.

According to one known method, the fines separated in the preparation of the super absorbent polymer are reassembled into large particles by a reassembly process, and then manufactured and used as a super absorbent polymer. As a representative method of the reassembly method, there is a method of agglomeration by mixing the fines with water.

As the amount of water used in the reassembly process of the fines increases, granulation strength of the fine reassembly is improved. However, when an excess of water is used, the amount of energy used during a drying process of the fine reassembly increases, resulting in high costs. Furthermore, if moisture in the fine reassembly is not sufficiently removed during the drying process, problems such as an increase in the load on the device for preparing a super absorbent polymer may occur.

Conversely, when the amount of water used in the reassembly process is reduced, cohesive strength is lowered due to the low moisture content in the reassembly, and as a result, reassembly is not performed properly and the amount of re-fines which are reduced again into the fines increases. In addition, there is a problem in that physical properties such as absorbency of the super absorbent polymer prepared by the reassembly process are not sufficient. Accordingly, a method of improving the granulation strength and reducing the amount of re-fines by performing an additional extrusion process on the fine reassembly having a low moisture content is being used.

Accordingly, the development of a reassembly process of fines capable of solving the above-mentioned problems is continuously required.

DETAILED DESCRIPTION OF THE INVENTION

Technical Problem

Accordingly, in the present disclosure, there is provided a method for preparing a super absorbent polymer capable of improving drying efficiency of the reassembly, reducing a generation amount of re-fines, and simultaneously improving absorption performance, in particular, absorption under pressure and permeability of the finally prepared super absorbent polymer by controlling granulation strength of the extruded fine reassembly.

Technical Solution

According to one embodiment of the present disclosure, there is provided a method for preparing a super absorbent polymer, including: preparing a hydrogel polymer by polymerizing a monomer composition comprising a water-soluble ethylene-based unsaturated monomer having at least partially neutralized acidic groups and a polymerization initiator; drying and pulverizing the hydrogel polymer, and performing classification into fines having a particle diameter of less than 150 μm and normal particles having a particle diameter of 150 to 850 μm; preparing a fine reassembly by mixing the fines with water and a polycarboxylic acid-based copolymer, followed by reassembling; preparing an extruded fine reassembly by extruding the fine reassembly while adding water, followed by drying, pulverization and classification; and mixing the extruded fine reassembly with the normal particles, and then performing a surface cross-linking reaction by adding a surface cross-linking agent; wherein 30 to 80 parts by weight of water are used based on 100 parts by weight of the fines in the preparation of the fine reassembly, and 15 to 30 parts by weight of water are used based on 100 parts by weight of the fine reassembly in the preparation of the extruded fine reassembly.

Advantageous Effects

The method for preparing a super absorbent polymer according to the present disclosure can improve drying efficiency of the extruded fine reassembly, reduce a generation amount of re-fines, and simultaneously improve absorption performance, in particular, absorption pressure and permeability of the finally prepared super absorbent polymer by controlling granulation strength of the extruded fine reassembly prepared in the preparation of the super absorbent polymer.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. In the present disclosure, the terms "include", "comprise", or "have" specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the method for preparing a super absorbent polymer according to a specific embodiment of the present invention will be described in more detail.

In the present disclosure, fine particles having a particle diameter of a predetermined particle size or less, i.e., about less than 150 μm, are referred to as a super absorbent polymer fine powder, a SAP fine powder or a fine powder (fines), and particles having a particle diameter of 150 μm to 850 μm are referred to as normal particles. The fines may be generated during the polymerization process, the drying process, or the pulverization step of the dried polymer. When the fines are included in final products, it is difficult to handle, and physical properties may be deteriorated, for example, gel blocking phenomenon may occur. Therefore, it is preferable to exclude the fines from the final products, or to reuse the fines to become normal particles. For example, a reassembly process in which the fines are aggregated to have a normal particle size may be performed. In general, in order to increase cohesive strength in the reassembly process, the fines are aggregated in a wet state. If the moisture content of the fines is increased, cohesive strength of the fines increases, but a reassembled mass may be generated in the reassembly process, which may cause problems during operation of the process. If the moisture content is reduced, the reassembly process is easy, but cohesive strength of the reassembly is not sufficient, which may cause a generation of re-fines after reassembly. In addition, the fine reassembly obtained in this way has lower physical properties such as centrifuge retention capacity (CRC) and absorption under pressure (AUP) than normal particles, which may lead to a decrease in the quality of the super absorbent polymer.

In addition, an additive such as polyethylene glycol were conventionally added to reduce the generation of fines. However, when the fine reassembly is prepared by using such an additive, less water is usually added, which has a problem in that granulation strength of the fine reassembly is excessively increased.

As a result of the continuous experimentation by the present inventors, the present technology has the following characteristics: a polycarboxylic acid-based copolymer is added in the preparation of a fine reassembly, a process for preparing an extruded fine reassembly by extrusion is further performed on the fine reassembly after the preparation of the fine reassembly, and granulation strength of the prepared extruded fine reassembly is adjusted by controlling the amount of water input in the preparation of the fine reassembly and the extruded fine reassembly. And, the present inventors have confirmed that drying efficiency can be improved during the subsequent drying process, a generation amount of re-fines can be reduced, and as a result, absorption performance, particularly absorption under pressure and permeability, of the finally prepared super absorbent polymer can be improved.

Therefore, according to one embodiment of the present disclosure, it is possible to provide a fine reassembling process having various process advantages and a method for preparing a super absorbent polymer to which the reassembling process is applied, and thus, a super absorbent polymer exhibiting excellent physical properties can be manufactured.

Specifically, the method for preparing a super absorbent polymer according to one embodiment of the present disclosure includes the steps of:

preparing a hydrogel polymer by polymerizing a monomer composition containing a water-soluble ethylene-based unsaturated monomer having at least partially neutralized acidic groups and a polymerization initiator (step 1);

drying and pulverizing the hydrogel polymer, and performing classification into fines having a particle diameter of less than 150 μm and normal particles having a particle diameter of 150 to 850 μm (step 2);

preparing a fine reassembly by mixing the fines with water and a polycarboxylic acid-based copolymer, followed by reassembling (step 3);

preparing an extruded fine reassembly by extruding the fine reassembly while adding water, followed by drying, pulverization and classification (step 4); and mixing the extruded fine reassembly with the normal particles, and then performing a surface cross-linking reaction by adding a surface cross-linking agent (step 5);

wherein 30 to 80 parts by weight of water are used based on 100 parts by weight of the fines in the preparation of the fine reassembly, and 15 to 30 parts by weight of water are used based on 100 parts by weight of the fine reassembly in the preparation of the extruded fine reassembly.

Hereinafter, each step will be described in more detail.

The "polymer" in the present disclosure is in a state in which a water-soluble ethylene-based unsaturated monomer is polymerized, and may include all moisture content ranges, all particle diameter ranges, all surface cross-linking states, or processing states. Among the polymers, a polymer having a moisture content of about 40 wt % or more which is in a state after polymerization and before drying may be referred to as a hydrogel polymer.

The term "super absorbent polymer" refers to the polymer itself, or includes all the polymers that have been made suitable for commercialization through additional processes such as surface cross-linking, fine reassembly, drying, pulverization, classification, etc., depending on the context.

In the preparation method according to one embodiment of the present disclosure, step 1 is a step of preparing a hydrogel polymer.

The hydrogel polymer may be specifically prepared by polymerizing a monomer composition containing a water-soluble ethylene-based unsaturated monomer having at least partially neutralized acidic groups and a polymerization initiator.

The water-soluble ethylene-based unsaturated monomer may be any monomer commonly used in the preparation of a super absorbent polymer. Specifically, the water-soluble ethylene-based unsaturated monomer may have acidic groups, and some of the acidic groups may be neutralized by a neutralizing agent.

For example, as the water-soluble ethylene-based unsaturated monomer, at least one monomer selected from the group consisting of an anionic monomer and a salt thereof, a nonionic hydrophilic monomer, and an amino-containing unsaturated monomer and a quaternary compound thereof may be used.

Specifically, as the water-soluble ethylene-based unsaturated monomer, at least one selected from the group consisting of an anionic monomer of (meth)acrylic acid, maleic anhydride, fumalic acid, crotonic acid, itaconic acid, 2-acryloylethanesulfonic acid, 2-methacryloylethanesulfonic acid, 2-(meth)acryloylpropane sulfonic acid, or 2-(meth)acrylamide-2-methyl propane sulfonic acid, and a salt thereof; a nonionic hydrophilic monomer of (meth)acrylamide, N-substituted (meth)acrylate, 2-hydroxyethyl(meth)acrylate, 2-hydroxypropyl (meth)acrylate, methoxypolyethyleneglycol(meth)acrylate, or polyethyleneglycol(meth)acrylate; and an amino-containing unsaturated monomer of (N,N)-dimethylaminoethyl(meth)acrylate or (N,N)-dimethylaminopropyl(meth)acrylamide, and a quaternary compound thereof may be used.

More Specifically, acrylic acid or a salt thereof, for example, acrylic acid or an alkali metal salt thereof such as sodium salt, may be used. By using the monomer, it becomes possible to prepare a super absorbent polymer having superior physical properties.

In addition, the water-soluble ethylene-based unsaturated monomer may be used by neutralizing some of the acid groups with a neutralizing agent. As such, when a water-soluble ethylene-based unsaturated monomer having at least partially neutralized acidic groups is used, the prepared polymer has water retention properties and absorbs surrounding water to form a hydrogel polymer having a moisture content of 40 wt % or more.

At this time, a basic material such as sodium hydroxide, potassium hydroxide, ammonium hydroxide, etc. that can neutralize an acidic group in the water-soluble ethylene-based unsaturated monomer may be used as the neutralizing agent.

In addition, the amount of the neutralizing agent may be appropriately determined in consideration of the degree of neutralization of the water-soluble ethylene-based unsaturated monomer or the degree of neutralization in the hydrogel polymer. For example, a degree of neutralization of the water-soluble ethylene-based unsaturated monomer may be 50 to 90 mol %, 60 to 85 mol %, 65 to 85 mol %, or 65 to 75 mol %, wherein the degree of neutralization refers to the degree to which the acidic groups contained in the water-soluble ethylene-based unsaturated monomer are neutralized by the neutralizing agent. The range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, a concentration of the water-soluble ethylene-based unsaturated monomer may be about 20 to 60 wt %, or about 40 to 50 wt % based on the monomer composition containing the raw materials of the super absorbent polymer and the solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

In the preparation method according to the present disclosure, the polymerization initiator is not particularly limited as long as it is generally used in the preparation of a super absorbent polymer.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

The polymerization initiator may be used in an amount of 0.001 to 2 wt % based on a total weight of the monomer composition. When the concentration of the polymerization initiator is excessively low, the polymerization rate may become slow, and a large amount of residual monomers may be extracted from the final product. Conversely, when the concentration of the polymerization initiator is higher than the above range, polymer chains forming a network are shortened, so that the content of extractable components increases and absorption under pressure decreases, thereby lowering physical properties of the polymer.

More specifically, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, diphenyl(2,4,6-trimethylbenzoyl)-phosphine oxide, or commercial lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present disclosure is not limited thereto.

When the photopolymerization initiator is used, a concentration of the photopolymerization initiator in the monomer composition may be about 0.01 to about 1.0 wt %. When the concentration of the photopolymerization initiator is excessively low, the polymerization rate may become slow, and when the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

When the thermal polymerization initiator is used, a concentration of the thermal polymerization initiator included in the monomer composition may be 0.001 to 0.5 wt %. When the concentration of the thermal polymerization initiator is excessively low, additional thermal polymerization hardly occurs and there may be less effect of adding the thermal polymerization initiator. When the concentration of the thermal polymerization initiator is excessively high, the molecular weight of the super absorbent polymer may become low and the properties may be uneven.

In the preparation method according to the present disclosure, the monomer composition may further include an internal cross-linking agent as a raw material of the super absorbent polymer.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds both on the surface and on the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

The internal cross-linking agent may be a cross-linking agent having one or more ethylene-based unsaturated groups in addition to the functional group which may react with the water-soluble substituents of the water-soluble ethylene-based unsaturated monomer; or a cross-linking agent having two or more functional groups which may react with the water-soluble substituents of the monomer and/or the water-soluble substituents formed by hydrolysis of the monomer.

As the specific example of the internal cross-linking agent, a C8-C12 bisacrylamide, bismethacrylamide, a poly(meth)acrylate of C2-C10 polyol, a poly(meth)allylether of C2-C10 polyol, or the like may be used. More specifically, one or more agents selected from the group consisting of N,N'-methylenebis(meth)acrylate, ethyleneoxy(meth)acrylate, polyethyleneoxy(meth)acrylate, polyethyleneglycol diacrylate, polypropyleneoxy(meth)acrylate, glycerin diaciylate, glycerin triacrylate, trimethylol triacrylate, triallylamine, triarylcyanurate, triallylisocyanate, polyethyleneglycol, diethyleneglycol, and propyleneglycol may be used.

This internal cross-linking agent may be included at a concentration of 0.01 to 0.5 wt % based on the monomer composition, so that the polymerized polymer can be cross-linked. The polymer formed using an internal cross-linking agent has a three-dimensional network structure in which main chains formed by polymerization of the water-soluble ethylene-based unsaturated monomers are cross-linked by the internal cross-linking agent. When the polymer has a three-dimensional network structure, water retention capacity and absorption under pressure, which are general physical properties of the super absorbent polymer, can be significantly improved compared to the case of having a two-dimensional linear structure that is not further cross-linked by the internal cross-linking agent. However, when the content of the internal cross-linking agent exceeds 0.5 wt %, the internal cross-linking density increases, and thus it may be difficult to achieve a desired level of water retention capacity.

In the preparation method according to the present disclosure, the monomer composition may further include an additive such as a thickener, a plasticizer, a preservation stabilizer, and an antioxidant, if necessary.

The raw materials such as the water-soluble ethylene-based unsaturated monomer, the photopolymerization initiator, the thermal polymerization initiator, the internal cross-linking agent, and the additive may be prepared in the form of a monomer composition solution dissolved in a solvent.

At this time, any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used.

The solvent may be included in the monomer composition at a residual quantity except for the above components.

Meanwhile, the method of preparing the hydrogel polymer by thermal polymerization or photopolymerization of the monomer composition is not particularly limited if it is a common polymerization method for preparing a super absorbent polymer.

Specifically, the polymerization method is largely divided into the thermal polymerization and the photopolymerization according to an energy source of the polymerization. In the case of thermal polymerization, it is generally carried out in a reactor equipped with an agitation spindle, such as a kneader. In the case of photopolymerization, it may be carried out in a reactor equipped with a movable conveyor belt. However, the polymerization method is just an example, and the present disclosure is not limited thereto.

For example, in the reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer composition to be injected, and a hydrogel polymer having a weight average particle diameter of 2 to 50 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of 0.5 to 5 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

Through the above-described preparation process, a hydrogel polymer obtained by polymerization of a water-soluble ethylene-based unsaturated monomer is prepared.

When the monomer composition further includes an internal cross-linking agent in the preparation of the hydrogel polymer, the prepared hydrogel polymer has a three-dimensional network structure in which main chains formed by polymerization of the water-soluble ethylene-based unsaturated monomers are cross-linked by the internal cross-linking agent.

Generally, the moisture content of the hydrogel polymer obtained by the above method may be 40 to 80 wt %. At this time, "moisture content" of the hydrogel polymer in the present disclosure is the content of moisture in the entire weight of the hydrogel polymer, and it means a value of which the weight of the dried polymer is subtracted from the weight of the hydrogel polymer. Specifically, the moisture content is defined as a value calculated according to the following Equation 1 by measuring the weight loss due to moisture evaporation from the polymer in the process of increasing the temperature of the polymer for drying through infrared heating. At this time, the drying condition for measuring the moisture content is as follows: the temperature is increased to about 180° C. and maintained at 180° C., and the total drying time is 20 minutes including 5 minutes of a heating step.

Moisture content (wt %)=[$(Ao-At)/Ao$]×100 [Equation 1]

In the above Equation, At is the weight of the sample after drying, and Ao is the weight of the sample before drying. In addition, the sample is a hydrogel polymer, which is a target for measuring the moisture content.

In the preparation method according to the present disclosure, a coarse pulverization process may be selectively performed on the hydrogel polymer obtained above.

Herein, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverization step, the hydrogel polymer may be pulverized to have a diameter of about 2 to 20 mm.

It is technically difficult to coarsely pulverize the hydrogel polymer to have a diameter of less than 2 mm because of its high moisture content, and there may be a phenomenon that the pulverized particles cohere with each other. Meanwhile, when the polymer is coarsely pulverized to have a diameter of larger than 20 mm, the efficiency enhancing effect in the subsequent drying step may be insignificant.

Subsequently, step 2 is a step of drying and pulverizing the hydrogel polymer prepared in the step 1, and performing classification into fines having a particle diameter of less than 150 μm and normal particles having a particle diameter of 150 to 850 μm.

The drying process of the hydrogel polymer may be performed at 150 to 250° C.

When the drying temperature is lower than 150° C., the drying time may become excessively long and the properties of the super absorbent polymer finally prepared may decrease. And when the drying temperature is higher than 250° C., only the surface of the polymer is excessively dried, a large amount of fines may be generated in the subsequent grinding process, and properties of the super absorbent polymer finally prepared may decrease. More specifically, the drying process may preferably be performed at a temperature of 150° C. or more, or 160° C. or more, and 200° C. or less, or 180° C. or less.

Furthermore, the drying time may be about 20 to about 90 minutes in consideration of process efficiency.

The drying method in is not particularly limited if it has been generally used in the drying process of the hydrogel polymer. Specifically, the drying step may be carried out by the method of hot air provision, infrared radiation, microwave radiation, UV ray radiation, and the like.

The moisture content of the polymer after the drying step may be 0.1 to 10 wt %.

Subsequently, a pulverization process is performed on the dried polymer.

The pulverization process may be performed according to a conventional method, and specifically, a pin mill, a hammer mill, a screw mill, a roll mill, a disc mill, or a jog mill may be used, but the present disclosure is not limited thereto.

After the pulverization process, in order to control the properties of the super absorbent polymer powder to be finally commercialized, the polymer powder obtained after pulverization is generally classified according to the particle diameter.

Specifically, it is classified into normal particles having a particle diameter of 150 to 850 (and fines having a particle diameter of less than 150 μm using a ASTM standard mesh.

Subsequently, step 3 is a step of mixing the fines having a particle diameter of less than 150 μm classified in the step 2 with water and a polycarboxylic acid-based copolymer as an additive, followed by reassembling to prepare a fine reassembly.

In the preparation of the fine reassembly, water may increase cohesive strength during agglomeration between fine particles. Accordingly, it is possible to control granulation strength of the fine reassembly by adjusting the input amount of water. Specifically, in the present disclosure, water is added in an amount of 30 to 80 parts by weight based on 100 parts by weight of the fines. When the input amount of water is less than 30 parts by weight, it is difficult to evenly disperse a small amount of water due to the fast absorption rate of the fines, and as a result, uniformity of the fine reassembly may be deteriorated. In addition, the moisture content of the prepared fine reassembly is reduced, which may form a hard lump in a subsequent extrusion process, and as a result, may reduce operational stability of the extrusion process. Furthermore, since the granulation strength of the fine reassembly is low, the amount of re-fines may be increased, and as a result, absorbency of the super absorbent polymer to be finally prepared may be reduced. Meanwhile, when the input amount of water exceeds 80 parts by weight, the moisture content of the fine reassembly excessively increases, and as a result, the amount of water to be evaporated during the drying process increases, so that the load on the dryer increases. In addition, drying is not performed properly, and as a result, the subsequent pulverization process is not performed properly. More specifically, water may be added in an amount of 30 parts by weight or more, 35 parts by weight or more, 37 parts by weight or more, or 40 parts by weight or more, and 80 parts by weight or less, 70 parts by weight or less, 60 parts by weight or less, or 50 parts by weight or less based on 100 parts by weight of the fines.

In addition, in the present disclosure, a polycarboxylic acid-based copolymer is added as an additive for increasing dispersibility in the formation of the fine reassembly, thereby increasing stability of continuous operation of the reassembling process.

The polycarboxylic acid-based copolymer serves to improve mixing stability and uniformity by lubricating action in the mixer. In general, permeability among the physical properties of super absorbent polymers has a trade-off relationship with water retention capacity and absorption under pressure. When the polycarboxylic acid-based copolymer is added, it is possible to provide a super absorbent polymer having excellent permeability while having excellent absorption characteristics such as water retention capacity and absorption under pressure.

Specifically, the polycarboxylic acid-based copolymer may include at least one of a repeating unit represented by the following Chemical Formula 1-a and a repeating unit represented by the following Chemical Formula 1-b:

[Chemical Formula 1-a]

[Chemical Formula 1-b]

in the Chemical Formulae 1-a and 1-b, $R^1$, $R^2$ and $R^3$ are each independently hydrogen or a C1 to C6 alkyl group, RO is a C2 to C4 oxyalkylene group, $M^1$ is hydrogen, or a monovalent metal or non-metal ion, X is —COO—, a C1 to C5 alkyloxy group, or a C1 to C5 alkyldioxy group, m is an integer of 1 to 100, n is an integer of 1 to 1000, and p is an integer of 1 to 150, and when p is 2 or more, two or more repeating —RO— are the same as or different from each other.

Herein, the polycarboxylic acid-based copolymer may include at least one repeating unit having a different structure among the repeating units represented by the Chemical Formula 1-a; at least one repeating unit having a different structure among the repeating units represented by the Chemical Formula 1-b; or the repeating unit represented by the Chemical Formula 1-a and the repeating unit represented by the Chemical Formula 1-b.

More specifically, it may be more advantageous to use a copolymer including a repeating unit derived from an alkoxy polyalkylene glycol mono(meth)acrylic acid ester-based monomer (e.g., methoxy polyethylene glycol monomethacrylate (MPEGMAA), etc.); and a repeating unit derived from (meth)acrylic acid or an ester-based monomer thereof (e.g., (meth)acrylic acid, etc.) as the polycarboxylic acid-based copolymer to achieve the above-described effect. More specifically, it may be more advantageous to use a copolymer including a repeating unit derived from methoxy polyethylene glycol monomethacrylate and a repeating unit derived from (meth)acrylic acid, or a random copolymer including a repeating unit derived from methoxy polyethylene glycol monomethacrylate and a repeating unit derived from (meth)acrylic acid.

In addition, the polycarboxylic acid-based copolymer preferably has a weight average molecular weight of 500 to 1,000,000 g/mol so that the effect of the addition of the polycarboxylic acid-based copolymer is well exhibited. More specifically, the weight average molecular weight may be 500 g/mol or more, 5,000 g/mol or more, 10,000 g/mol or more, 35,000 g/mol or more, or 40,000 g/mol or more, and 1,000,000 g/mol or less, 800,000 g/mol or less, 500,000 g/mol or less, 100,000 g/mol or less, or 60,000 g/mol or less. When the molecular weight of the polycarboxylic acid-based copolymer is less than 500 g/mol, the lubricating action may be reduced, and when it exceeds 1,000,000 g/mol, solubility in water may be reduced.

Meanwhile, in the present disclosure, the weight average molecular weight (Mw) of the polycarboxylic acid-based copolymer can be measured using gel permeation chromatography. Specifically, PL-GPC220 manufactured by Waters was used as the gel permeation chromatography (GPC) instrument, and a Polymer Laboratories PLgel MIX-B column (300 mm in length) was used. An evaluation temperature was 160° C., and 1,2,4-trichlorobenzene was used for a solvent at a flow rate of 1 mL/min. 10 mg of the polycarboxylic acid-based copolymer sample was pretreated by dissolving in 1,2,4-trichlorobenzene containing 0.0125% of BHT at 160° C. for 10 hours using PL-SP260 (manufactured by Agilent Technology) which is a sample pretreatment system, and the sample with a concentration of 10 mg/10 mL was supplied in an amount of 200 µL. Mw was obtained using a calibration curve formed using a polystyrene standard. 9 kinds of the polystyrene standard were used with the molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

The polycarboxylic acid-based copolymer may be used in an amount of 0.01 to 5 parts by weight based on 100 parts by weight of the fines, more specifically in an amount of 0.01 parts by weight or more, 0.05 parts by weight or more, or 0.1 parts by weight or more, and 5 parts by weight or less, 1 parts by weight or less, 0.9 parts by weight or less, 0.8 parts by weight or less, 0.5 parts by weight or less, or 0.3 parts by weight or less. When the content of the polycarboxylic acid-based copolymer is less than 0.01 parts by weight, it is difficult to obtain the effect of improving the mixing stability and uniformity of the fine reassembly by the additive, and when the content of the polycarboxylic acid-based copolymer exceeds 5 parts by weight, the surface tension and discoloration performance of the final product may be reduced.

In addition, the additive of the polycarboxylic acid-based copolymer may be mixed with water and fines at the same time, or may be mixed with water first and then mixed with fines.

Meanwhile, the above-described step of preparing the fine reassembly using water and the additive of the polycarboxylic acid-based copolymer may be performed using a mixing device or mixer capable of applying a shear force. Specifically, the fines, water, and the polycarboxylic acid-based copolymer are mixed by stirring at 300 to 2000 rpm, more specifically 300 rpm or more, 500 rpm or more, or 650 rpm or more, and 2000 rpm or less, 1,800 rpm or less, 1,500 rpm or less, or 1,000 rpm or less using a mixing device or mixer. When stirring at a speed within the above range, a sufficient shear force is applied to enable homogeneous mixing.

Subsequently, step 4 is a step of preparing an extruded fine reassembly by extruding the fine reassembly obtained in the step 3 while adding water, followed by pulverization and classification.

The step of preparing the extruded fine reassembly may be performed according to a conventional preparation method of the extruded fine reassembly except for adding water during the extrusion process.

The extrusion process with respect to the fine reassembly may be performed using a conventional extruder such as a meat chopper. In the preferable extruder of the present disclosure, a cutter such as an inverter cutter, a blade, a scraper or a knife is installed at the rear end of the extruder, for example, at a hole plate outlet, and thus a cutting process can be performed on the fine reassembly discharged in the form of a stem after extrusion. For example, in the case of using an extruder with an inverter cutter installed at the hole plate outlet at the rear end of the extruder like SMC-22 (manufactured by SL Corporation), when the fine reassembly is put into the extruder, it is transferred through a screw provided in the extruder. And as it passes through the hole plate, it is extruded and the strength increases. During the extrusion, the fine reassembly may be extruded in the form of a stem, and then may be cut into particles by the inverter cutter while being discharged through the hole plate outlet.

The extrusion force applied to the fine reassembly during the extrusion process can be adjusted by controlling the hole diameter at the outlet of the extruder and the extruder speed.

Specifically, the hole diameter may be 10 mm or more, 12 mm or more, or 14 mm or more, and 20 mm or less, or 16 mm or less. In addition, the extruder speed may be 80 rpm or more, and 150 rpm or less. This corresponds to 35 Hz or higher and 60 Hz or lower. When the hole diameter and the extruder speed are within the above ranges, sufficient pressure is applied to the fine reassembly, so that an extruded fine reassembly having an appropriate granulation strength can be formed. When the hole diameter is less than 10 mm or the extruder speed exceeds 150 rpm, the pressure applied to the fine reassembly may be too high, and it may be difficult to discharge the extruded fine reassembly from the extruder. For example, in the case of using an extruder with a hole diameter of 0.1 to 1 mm in a dome shape like Fuji Paudal DG-L1, when water is added during the manufacture of the extruded fine reassembly, the extruded fine reassembly is not discharged from the dome, and as a result, the equipment may stop. Meanwhile, when the hole diameter exceeds 20 mm or the extruder speed is less than 80 rpm, sufficient pressure is not applied to the fine reassembly, so that agglomeration may not occur sufficiently.

Meanwhile, in the preparation method according to one embodiment of the present disclosure, water is added during the extrusion process to lower granulation strength of the extruded fine reassembly to a certain level, and the granulation strength is optimized by controlling the input amount of water. Specifically, in the extrusion process, 15 to 30 parts by weight of water is added based on 100 parts by weight of the fine reassembly. When the input amount of water is less than 15 parts by weight, the input amount is small and dispersibility of water in the fine reassembly is lowered, so the effect of adjusting the strength is insignificant. When it exceeds 30 parts by weight, the granulation strength becomes too low, and there is a problem in that the drying time becomes long due to an increase in the drying capacity. More specifically, water may be added in an amount of 15 parts by weight or more, 17 parts by weight or more, or 20 parts by weight or more, and 30 parts by weight or less, or 25 parts by weight or less.

As described above, in the method for preparing a super absorbent polymer according to one embodiment of the present disclosure, the input amount of water in the step of preparing the fine reassembly and in the step of preparing the extruded fine reassembly is respectively controlled within the above-described range, so that the total input amount of water compared to the fines is smaller than that of the conventional method for preparing a super absorbent polymer. Specifically, in the case of preparing the fine reassembly according to the conventional method for preparing a super absorbent polymer, water is usually added in an amount equal to or greater than the total weight of the fines, that is, 100 parts by weight or more of water compared to 100 parts by weight of the fines. On the other hand, in the method for preparing a super absorbent polymer according to the present disclosure, the total amount of water input in the preparation of the fine reassembly and the extruded fine reassembly is less than the total weight of the fines. That is, the total amount of water input in the preparation of the fine reassembly and the extruded fine reassembly may be less than 100 parts by weight, 90 parts by weight or less, 80 parts by weight or less, 75 parts by weight or less, or 70 parts by weight or less, and more than 0 parts by weight, 40 parts by weight or more, 45 parts by weight or more, 50 parts by weight or more, 55 parts by weight or more, or 60 parts by weight or more compared to 100 parts by weight of the fines. Accordingly, the amount of fines generated in the preparation of a super absorbent polymer can be greatly reduced, and physical properties of the super absorbent polymer can be further improved, and drying load can be reduced. If the total input amount of water is greater than the total weight of the fines, the strength of the extruded fine reassembly increases, but absorption performance such as AUP and permeability may be reduced.

Subsequently, the extruded fine reassembly is dried, pulverized, and classified into extruded fine reassembly (reassembly normal particles) and reassembly fines (hereinafter referred to as "re-fines").

The drying process may be performed using a conventional drying machine. According to one embodiment of the present disclosure, it may be performed using a forced circulation dryer.

In addition, in the drying process, the temperature and time may be appropriately determined in consideration of the moisture content in the extruded fine reassembly. Specifically, the drying process may be performed at a temperature of 120 to 220° C. for 30 to 120 minutes. When the temperature is less than 120° C., the drying time may become long, and when it exceeds 220° C., physical properties may be degraded due to deterioration of the fine reassembly. In addition, when the drying time is less than 30 minutes, sufficient drying is difficult, and when the drying time exceeds 120 minutes, the moisture content in the extruded fine reassembly is greatly reduced due to excessive drying, and as a result, the generation rate of fines may increase in a subsequent process. More specifically, the drying process may be performed at a temperature of 120° C. or more, or 150° C. or more and 220° C. or less, or 200° C. or less for 30 minutes or more, or 50 minutes or more and 120 minutes or less, 90 minutes or less, or 70 minutes or less.

In addition, the drying process may be performed such that the moisture content in the dried extruded fine reassembly is 5 wt % or less, or 4.5 wt % or less, and 1 wt % or more, or 1.5 wt % or more. When the drying process is performed such that the moisture content in the dried extruded fine reassembly is less than 1 wt %, there is a risk of deterioration in physical properties of the fine reassembly.

Meanwhile, the moisture content in the extruded fine reassembly is defined as a value calculated according to the Equation 1 by measuring the weight loss due to moisture evaporation from the polymer in the process of increasing the temperature of the polymer for drying through infrared heating. At this time, the sample of Equation 1 is the extruded fine reassembly, and the drying condition is as follows: the temperature is increased to about 180° C. and maintained at 180° C., and the total drying time is 20 minutes including 5 minutes of a heating step.

Thereafter, the pulverization and classification are performed, and the pulverization and classification may be performed in the same manner as described above.

The pulverization may be performed such that the dried extruded fine reassembly has a particle diameter of about 150 to about 850 μm. The pulverizing machine used to pulverize to such a particle diameter is specifically a pin mill, a hammer mill, a screw mill, a roll mill, a disc mill, or a jog mill, but the present disclosure is not limited thereto.

After the pulverization process, in order to control the properties of the super absorbent polymer powder to be finally commercialized, the polymer powder obtained after pulverization is generally classified according to the particle diameter. Specifically, it is classified into re-fines having a particle diameter of less than 150 μm and reassembly normal particles having a particle diameter of 150 μm to 850 μm.

The extruded fine reassembly obtained after drying, pulverization and classification has a low proportion of re-crushing again into fines after the pulverization step, that is, a low proportion of re-fines or a low generation of re-fines, and has high granulation strength.

Specifically, the extruded fine reassembly has a generation amount of re-fines having a particle diameter of less than 150; after pulverization of about 20 wt % or less, 18 wt % or less, or 17 wt % or less based on a total weight of the extruded fine reassembly. Although the lower generation amount of re-fines can be evaluated as the better, it may be more than 0 wt %, 1 wt % or more, or 10 wt % or more in consideration of limitations in the process, and the like.

The generation amount of re-fines is measured by measuring the content of re-fines having a particle diameter of less than 150 μm after pulverizing the extruded fine reassembly to be prepared using a pulverizing machine such as a hammer mill, followed by classification, and then calculating a percentage of the weight of re-fines to the total weight of the extruded fine reassembly.

In addition, the extruded fine reassembly satisfies the following conditions of a1) to a3):
  a1) moisture content: 1 to 5 wt % based on a total weight of the extruded fine reassembly,
  a2) centrifuge retention capacity (CRC) measured according to EDANA WSP 241.3:30 to 50 g/g, and
  a3) absorption rate (vortex) measured according to JIS K 7224:30 to 50 seconds.

Specifically, the extruded fine reassembly has a moisture content of 1 to 5 wt %, more specifically 5 wt % or less, or 4.5 wt % or less, and 1 wt % or more, or 1.5 wt % or more.

As described above, the moisture content in the extruded fine reassembly is defined as a value calculated according to the Equation 1 by measuring the weight loss due to moisture evaporation from the polymer in the process of increasing the temperature of the polymer for drying through infrared heating. At this time, the sample of Equation 1 is the extruded fine reassembly, and the drying condition is as follows: the temperature is increased to about 180° C. and maintained at 180° C., and the total drying time is 20 minutes including 5 minutes of a heating step. The method and conditions for measuring the moisture content will be described in more detail in the following experimental examples.

In addition, the extruded fine reassembly has centrifuge retention capacity (CRC) measured according to EDANA WSP 241.3 of 30 to 50 g/g, and absorption rate measured according to JIS K 7224 of 30 to 50 seconds. The method and conditions for measuring the centrifuge retention capacity and absorption rate will be described in more detail in the following experimental examples.

Subsequently, step 5 is a step of preparing a super absorbent polymer by mixing the extruded fine reassembly obtained in the step 4 with the normal particles, and then performing a surface cross-linking reaction.

The extruded fine reassembly obtained in the step 4 may be used alone to prepare the super absorbent polymer. However, in the preparation method according to one embodiment of the present disclosure, a super absorbent polymer is prepared by mixing the extruded fine reassembly with normal particles, which are not reassembled fines, and then performing a surface cross-linking reaction.

Specifically, after the classification process in the step 4, the re-fines having a particle diameter of less than 150 μm are circulated to the fine reassembling process. Thereafter, the extruded reassembly fines, which are reassembly normal particles having a particle diameter of 150 to 850 μm, are mixed with the normal particles already described above, and then introduced into a surface cross-linking reactor to perform a surface cross-linking process.

The mixing ratio of the extruded fine reassembly and the normal particles may be appropriately adjusted depending on physical properties required for the final product. For example, the extruded fine reassembly and the normal particles may be mixed in a weight ratio of 10:90 to 90:10, and more specifically, in a weight ratio of 10:90 to 50:50, 15:85 to 40:60, 20:80 to 30:70, or 20:80 to 25:75.

The surface cross-linking is a step of increasing a cross-linking density near the surface of super absorbent polymer particles with regard to a cross-linking density inside the particles. Generally, surface cross-linking agents are applied on the surface of super absorbent polymer particles. Therefore, surface cross-linking reactions occur on the surface of the super absorbent polymer particles, which improves cross-linkability on the surface of the particles without substantially affecting the inside of the particles. Thus, the surface cross-linked super absorbent polymer particles have a higher degree of cross-linking at the surface than inside.

Herein, the surface cross-linking agent is not limited in its composition as long as it is a compound capable of reacting with a functional group of the polymer.

Specifically, in order to improve the properties of the super absorbent polymer to be prepared, at least one selected from the group consisting of a polyalcohol compound; an epoxy compound; a polyamine compound; a haloepoxy compound; a condensation product of the haloepoxy compound; an oxazoline compound; a mono-, di- or polyoxazolidinone compound; a cyclic urea compound; a polyvalent metal salt; and an alkylene carbonate compound may be used as the surface cross-linking agent.

Specific examples of the polyalcohol-based compound may include one or more selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy-based compound may include ethylene glycol diglycidyl ether, glycidol and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, and α-methylephichlorohydrin. Meanwhile, the mono-, di-, or polyoxazolidinone compound may include, for example, 2-oxazolidinone or the like.

Further, the alkylene carbonate-based compound may include ethylene carbonate, and the like. These may be used alone or in combination with each other. Meanwhile, to increase the efficiency of the surface cross-linking process, one or more of the polyalcohol-based compounds may be preferably included among these surface cross-linking agents. More preferably, polyalcohol-based compounds having 2 to 10 carbon atoms may be used.

The amount of the surface cross-linking agent added may be appropriately selected depending on the kind of the surface cross-linking agent added or the reaction conditions. However, the surface cross-linking agent may be generally used in an amount of about 0.001 to about 5 parts by weight, specifically about 0.01 to about 3 parts by weight, and more specifically about 0.05 to about 2 parts by weight, based on 100 parts by weight of the mixture of the normal particles and the extruded fine reassembly. When the amount of the surface cross-linking agent is excessively small, the surface cross-linking reaction hardly occurs, and when the amount is higher than 5 parts by weight based on 100 parts by weight of the mixture, absorption performance and physical properties may be decreased due to excessive surface cross-linking reaction.

The cross-linking reaction and the drying process may be carried out simultaneously by heating the polymer particles to which the surface cross-linking agent is added.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present disclosure is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

After the surface cross-linking, classification into surface cross-linked fines having a particle diameter of less than 150 μm and surface cross-linked normal particles having a particle diameter of 150 to 850 μm may be performed. At this time, the surface cross-linked fines having a particle diameter of less than 150; are re-injected into the process for reassembling the fines, and the surface cross-linked normal particle can be commercialized and used.

The super absorbent polymer prepared through the above-described process exhibits excellent absorption performance, and in particular, absorption under pressure and permeability may be improved at the same time. Specifically, the super absorbent polymer satisfies the following conditions of b1) to b4):

b1) centrifuge retention capacity (CRC) measured according to EDANA WSP 241.3:30 to 40 g/g, b2) absorption under pressure (0.7AUP) of the super absorbent polymer to 0.9 wt % aqueous solution of sodium chloride at 0.7 psi for 1 hour measured according to EDANA WSP 242.3:17 to 25 g/g, b3) permeability: 20 to 400 seconds, and b4) absorption rate (vortex) measured according to JIS K 7224:40 to 60 seconds.

Specifically, the super absorbent polymer has centrifuge retention capacity (CRC) to saline (0.9 wt % aqueous solution of sodium chloride) for 30 min measured according to EDANA WSP 241.3 of 30 g/g or more. As the higher value can be evaluated as the better, there is no practical upper limit. However, the upper limit is, for example, 40 g/g or less.

In addition, the super absorbent polymer has absorption under pressure (0.7AUP) to saline (0.9 wt % aqueous solution of sodium chloride) at 0.7 psi for 1 hour measured according to the following Equation 2 of 17 to 25 g/g. The method and conditions for measuring the absorption under pressure will be described in more detail in the following experimental examples.

$$0.7\text{AUP (g/g)} = [W_4 \text{ (g)} - W_3 \text{ (g)}]/W_0 \text{ (g)} \qquad \text{[Equation 2]}$$

In Equation 2, $W_0$ (g) is an initial weight (g) of the super absorbent polymer, $W_3$ (g) is a sum of a weight of the super absorbent polymer and a weight of the device providing a load to the polymer, and $W_4$ (g) is a sum of a weight of the super absorbent polymer and a weight of the device providing a load to the polymer, after making the super absorbent polymer absorb the saline for one hour under a load (0.7 psi).

In addition, the super absorbent polymer has permeability of 20 to 400 seconds.

In the present disclosure, the permeability of the super absorbent polymer may be measured by the method described in the literature (Buchholz, F. L. and Graham, A. T., "Modern Superabsorbent Polymer Technology," John Wiley & Sons (1998), page 161) under a load of 0.3 psi with 0.9% saline solution. The method and conditions for measuring the permeability will be described in more detail in the following experimental examples.

In addition, the super absorbent polymer has an absorption rate (vortex) measured according to JIS K 7224 of 40 to 60 seconds. The method and conditions for measuring the absorption rate will be described in more detail in the following experimental examples.

Accordingly, the super absorbent polymer can be very preferably applied to various hygiene products such as adult diapers, and in particular, can be effectively used in hygiene products having a reduced pulp content. The hygiene product includes disposable absorbent products, preferably diapers, and the diaper may be for children or adults.

Hereinafter, the present invention will be described in more detail with the following preferred examples. However, these examples are provided for illustrative purposes only, and the content of the present invention is not limited by the following examples. In addition, in the following examples and comparative examples, "%" and "part" indicating the content are by weight unless otherwise specified.

PREPARATION EXAMPLES 400 parts by weight of ion-exchanged water was injected into a 3 L four-neck flask reactor equipped with a stirrer, thermometer, nitrogen inlet, and circulation condenser, and the inside of the reactor was replaced with nitrogen while stirring and heated to 75° C. under a nitrogen atmosphere.

After adding 2 parts by weight of ammonium persulfate to the reactor and completely dissolving it, an aqueous monomer solution containing 600 parts by weight of methoxy polyethylene glycol monomethacrylate (average addition mole number of ethylene oxide (EO): about 50 mol), 99.6 parts by weight of methacrylic acid, and 190 parts by weight of water, a mixed solution of 5 parts by weight of 3-mercaptopropionic acid and 60 parts by weight of water, and 150 parts by weight of an aqueous solution of ammonium persulfate having a concentration of 3 wt % were continuously added at a uniform rate for 4 hours. After completion of the addition, 5 parts by weight of an aqueous solution of ammonium persulfate having a concentration of 3 wt % was added again at once. After that, the internal temperature of the reactor was raised to 85° C., and then the temperature was maintained at 85° C. continuously for 1 hour to complete the polymerization reaction.

The prepared polycarboxylic acid copolymer exhibited a weight average molecular weight of 40,000 g/mol when analyzed by gel permeation chromatography (GPC) under the following conditions.

<Analysis Conditions>
GPC analyzer: PL-GPC220 manufactured by Waters
Column: PLgel MIX-B column manufactured by Polymer Laboratories (300 mm in length)
Measuring temperature: 160° C.
Solvent: 1,2,4-trichlorobenzene
Flow rate: 1 mL/min
Sample preparation: 10 mg of a polycarboxylic acid copolymer sample was pretreated by dissolving in 1,2,4-trichlorobenzene containing 0.0125% of BHT at 160° C. for 10 hours using PL-SP260 (manufactured by Agilent Technology) which is a sample pretreatment system, and the sample with a concentration of 10 mg/10 mL was supplied in an amount of 200 μL.

Mw was obtained using a calibration curve formed using a polystyrene standard (9 kinds of the polystyrene standard were used with the molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol).

Example 1

In a 3 L glass vessel equipped with a stirrer, nitrogen inlet, and thermometer, 518 g of acrylic acid, 3.2 g of polyethyleneglycol (400) diacrylate, and 0.04 g of diphenyl (2,4,6-trimethylbenzoyl)-phosphine oxide were added and mixed. 822.2 g of 24.5% aqueous solution of sodium hydroxide was added to the resulting mixed solution, and mixed while continuously adding nitrogen, thereby preparing a water-soluble unsaturated monomer aqueous solution as a monomer composition. The prepared water-soluble unsaturated monomer aqueous solution was cooled to 40° C.

Then, 500 g of the water-soluble unsaturated monomer aqueous solution was placed in a stainless steel container having a width of 250 mm, a length of 250 mm, and a height of 30 mm, and UV polymerization was performed by irradiating UV rays for 90 seconds (irradiation amount: 10 mV/cm$^2$), thereby obtaining a hydrogel polymer.

After the obtained hydrogel polymer was coarsely pulverized to a size of 2 mm×2 mm, the obtained gel-type polymer was spread to a thickness of about 30 mm on stainless steel wire gauze having a pore size of 600 μm, and dried in a hot air oven at 180° C. for 30 minutes. The dried polymer thus obtained was pulverized using a pulverizing machine, and classified with a ASTM standard mesh to obtain fines having a particle diameter of less than 150 μm and normal particles having a particle diameter of 150 μm to 850 μm.

100 parts by weight of the fines, 40 parts by weight of water, and 0.1 parts by weight of the polycarboxylic acid copolymer (PCE) prepared in Preparation Example as an additive were added to a continuous mixer, mixed for 1 minute while stirring at 650 rpm, and then reassembled to prepare a fine reassembly.

The fine reassembly was put into an extruder (SMC-22, manufactured by SL Corporation, hole diameter: 16 mm, extruder speed: 88 rpm) with an inverter cutter installed at the hole plate outlet at the rear end of the extruder, and extruded while adding 20 parts by weight of water to 100 parts by weight of the fine reassembly. When the fine reassembly was put into the extruder, it was transferred through a screw provided in the extruder, and extruded while passing through the hole, resulting in high strength. At this time, the fine reassembly extruded in the form of a stem was cut by the inverter cutter provided inside the extruder. Thereafter, an extruded fine reassembly in the form of particles discharged from the extruder was obtained, put into a forced circulation dryer, and then dried at a temperature of 180° C. for 1 hour. After pulverizing this with a Hammer mill, it was classified with a ASTM standard mesh to obtain an extruded fine reassembly having a particle diameter of 150 to 850 μm and reassembly fines having a particle diameter of less than 150 μm, respectively.

The above-prepared normal particles and the extruded fine reassembly were mixed in a weight ratio of 75:25 (normal particles: extruded fine reassembly). A surface cross-linking solution prepared by mixing 0.2 parts by weight of poly (ethylene glycol) diglycidyl ether, 5 parts by weight of methanol, and 4 parts by weight of water was added to 100 parts by weight of the resulting mixture, and mixed to perform a surface cross-linking reaction at a temperature of 180° C. for 60 minutes, thereby obtaining a super absorbent polymer.

Examples 2 to 4

A super absorbent polymer was prepared in the same manner as in Example 1, except that the conditions were changed as shown in Table 1 below.

Comparative Example 1

It was performed in the same manner as in Example 1, except that the additive was not added in the process for preparing the fine reassembly in Example 1.

However, a lump was formed inside the mixer for preparing the fine reassembly, and thus continuous operation was impossible. As a result, it was not possible to perform subsequent processes for preparing an extruded fine reassembly and a super absorbent polymer (see Experimental Example 3 below).

Comparative Example 2 to 13

A super absorbent polymer was prepared in the same manner as in Example 1, except that the conditions were changed as shown in Table 1 below.

In the above Equation, At is the weight of the sample after drying, that is, the weight of the extruded fine reassembly after drying, and Ao is the weight of the sample before drying, that is, the weight of the extruded fine reassembly before drying.

TABLE 1

| Preparation conditions | Preparation of fine reassembly | | Preparation of extruded fine reassembly | | | |
|---|---|---|---|---|---|---|
| | Input amount of water (parts by weight $^a$)) | Additive/Input amount (parts by weight $^a$)) | Input amount of water (parts by weight $^b$)) | Outlet hole diameter (mm) | Extruder speed (rpm) | Mixing weight ratio of normal particles: extruded fine reassembly |
| Example 1 | 40 | PCE /0.1 | 20 | 16 | 88 | 75:25 |
| Example 2 | 40 | PCE /0.1 | 30 | 16 | 88 | 75:25 |
| Example 3 | 40 | PCE /0.1 | 30 | 16 | 88 | 80:20 |
| Example 4 | 30 | PCE /0.1 | 20 | 16 | 88 | 75:25 |
| Comparative Example 1 | 40 | 0 | impracticable | impracticable | impracticable | impracticable |
| Comparative Example 2 | 40 | PCE /0.1 | 0 | 10 | 88 | 75:25 |
| Comparative Example 3 | 40 | PCE /0.1 | 0 | 16 | 88 | 75:25 |
| Comparative Example 4 | 40 | PCE /0.1 | 0 | 20 | 88 | 75:25 |
| Comparative Example 5 | 40 | PEG6000/0.1 | 0 | 16 | 88 | 75:25 |
| Comparative Example 6 | 40 | PEG6000/0.2 | 0 | 16 | 88 | 75:25 |
| Comparative Example 7 | 40 | PCE /0.1 | 0 | 16 | 150 | 75:25 |
| Comparative Example 8 | 40 | PCE /0.1 | 10 | 16 | 88 | 75:25 |
| Comparative Example 9 | 40 | PCE /0.1 | 40 | 16 | 88 | 75:25 |
| Comparative Example 10 | 120 | 0 | 0 | 16 | 88 | 75:25 |
| Comparative Example 11 | 10 | PCE /0.1 | 20 | 16 | 88 | 75:25 |
| Comparative Example 12 | 120 | PCE /0.1 | 20 | 16 | 88 | 75:25 |
| Comparative Example 13 | 40 | PCE /0.1 | 0 | 16 | 88 | 80:20 |

In Table 1, a) is a value based on 100 parts by weight of the fines, and b) is a value based on 100 parts by weight of the fine reassembly.

In addition, PCE is the polycarboxylic acid copolymer (weight average molecular weight: 40,000 g/mol) prepared in Preparation Example, and PEG6000 is polyethylene glycol (number average molecular weight: 6000 g/mol).

Experimental Example 1

In the preparation of the extruded fine reassembly, drying characteristics depending on whether or not water is added during the extrusion process were comparatively evaluated.

Specifically, the extruded fine reassemblies of Example 1 and Comparative Example 2 were heated to 180° C. and dried. Then, the change in moisture content of the extruded fine reassembly over time was calculated according to Equation 1 below. The results are shown in Table 2 and FIG. 1 below.

Figure 1:
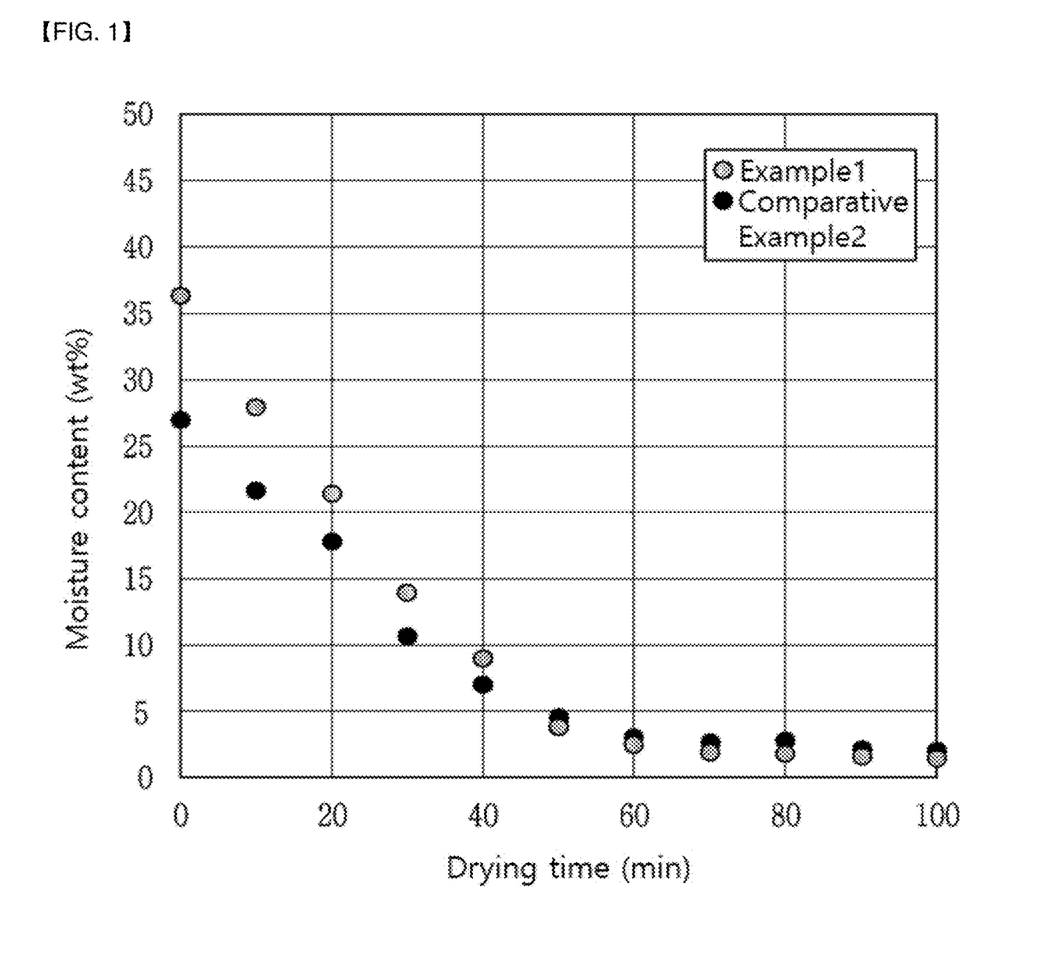
FIG. 1 is a graph showing a change in moisture content over time during a process for drying the extruded fine reassemblies of Example 1 and Comparative Example 2 in Experimental Example 1.

Moisture content (wt %)=[($Ao-At$)/$Ao$]×100  [Equation 1]

TABLE 2

| Drying time (min) | Moisture content of extruded fine reassembly (wt %) | |
|---|---|---|
| | Example 1 | Comparative Example 2 |
| 0 | 36.3 | 27.0 |
| 10 | 28.0 | 21.7 |
| 20 | 21.5 | 17.8 |
| 30 | 14.0 | 10.7 |
| 40 | 9.0 | 7.0 |
| 50 | 3.9 | 4.6 |
| 60 | 2.5 | 3.1 |
| 70 | 2.0 | 2.9 |
| 80 | 1.8 | 2.7 |
| 90 | 1.6 | 2.2 |
| 100 | 1.5 | 2.1 |

As a result of the experiment, Example 1 in which water was added during the extrusion process had a higher initial moisture content, but a faster drying rate than Comparative Example 2.

Experimental Example 2

In order to evaluate the change of the extruded fine reassembly and processability depending on whether or not water is added and the input amount of water during the preparation of the extruded fine reassembly, the extruded fine reassemblies according to Examples 1 and 2 and Comparative Examples 2 and 8 and the extruder after production were observed.

As a result, when no water was added (Comparative Example 2) or the input amount of water was too small (Comparative Example 8) during the extrusion process for preparing the extruded fine reassembly, the strongly extruded reassembly was discharged in the form of a stem. Accordingly, it can be expected that the drying time and load during the drying process increase.

Experimental Example 3

In order to evaluate the effect of the input amount of water and whether the additive is added during the preparation process of the fine reassembly on the manufacture of the super absorbent polymer, the mixer used for preparing the fine reassembly was observed in the manufacture of the super absorbent polymers according to Example 1 and Comparative Examples 1 and 10.

As a result, when the fine reassembly was prepared in Example 1, no lumps were formed inside the mixer, and stable continuous operation was possible.

On the other hand, in Comparative Example 1 in which the polycarboxylic acid copolymer was not added, a lump was formed inside the mixer, making continuous operation impossible, and as a result, a subsequent process for preparing the super absorbent polymer could not be performed. Also, in Comparative Example 10 in which the input amount of water was further increased during the preparation of the fine reassembly from Comparative Example 1, continuous operation was possible, but a lot of lumps were formed inside the mixer.

Experimental Example 4

The physical properties of the extruded fine reassemblies prepared in Examples and Comparative Examples were evaluated in the following manner, and the shape was observed. The results are shown in Table 3, FIGS. 2 and 3.

(1) Moisture Content (Wt %)

The moisture content is the content of moisture in the entire weight of the extruded fine reassembly, and can be calculated according to Equation 1 below.

Specifically, the moisture content was calculated by measuring the weight loss due to moisture evaporation from the reassembly in the process of increasing the temperature of the extruded fine reassembly for drying through infrared heating. At this time, the drying condition was as follows: the temperature was increased to about 180° C. and maintained at 180° C., and the total drying time was 20 minutes including 5 minutes of a heating step. The weight of the extruded fine reassembly before and after drying was measured, respectively, and calculated according to Equation 1 below.

$$\text{Moisture content (wt \%)} = [(A_o - A_t)/A_o] \times 100 \quad \text{[Equation 1]}$$

In the above Equation, At is the weight of the extruded fine reassembly after drying, and Ao is the weight of the extruded fine reassembly before drying.

(2) CRC (Centrifugal Retention Capacity)

The centrifuge retention capacity of the extruded fine reassemblies prepared in Examples and Comparative Examples was measured based on the EDANA WSP 241.3.

0.2 g of a sample of the extruded fine reassembly was placed in a tea bag and precipitated in 0.9% saline for 30 minutes. After dehydration for 3 minutes with a centrifugal force of 250G (gravity), the amount $W_2$ (g) of saline absorbed was measured. Further, after carrying out the same operation without using the extruded fine reassembly, the weight $W_1$ (g) at that time was measured.

Then, CRC (g/g) was calculated by using the obtained weight values according to the following Equation 3.

$$\text{CRC (g/g)} = \{[W_2(g) - W_1(g)]/W_0(g)\} - 1 \quad \text{[Equation 3]}$$

in the Equation 3, $W_0$ (g) is an initial weight (g) of the sample, $W_1$ (g) is a weight of a device, measured after dehydration with 250 G for 3 minutes using a centrifuge without using the sample, and $W_2$ (g) is a weight of the device including the sample after immersing the sample in 0.9 wt % physiological saline at room temperature for 30 minutes for absorption, followed by dehydration with 250 G for 3 minutes using a centrifuge.

(3) Absorption Rate (Vortex)

It was measured according to JIS K 7224.

Specifically, the absorption rate (vortex time) was calculated by adding 2 g of the extruded fine reassembly prepared in one of Examples and Comparative Examples to 50 ml of saline at 25° C., stirring a magnetic bar (8 mm in diameter and 30 mm in length) at 600 rpm, and measuring the time until vortex disappeared in seconds.

(4) Generation Amount of Re-Fines (Wt %)

The content of re-fines having a particle diameter of less than 150 (m was measured after pulverizing the extruded fine reassembly prepared in one of Examples and Comparatives using a hammer mill, followed by classification. Then, a percentage of the weight of re-fines to the total weight of the extruded fine reassembly was calculated and recorded as the generation amount of re-fines.

(5) Shape of Extruded Fine Reassembly

Figure 2:
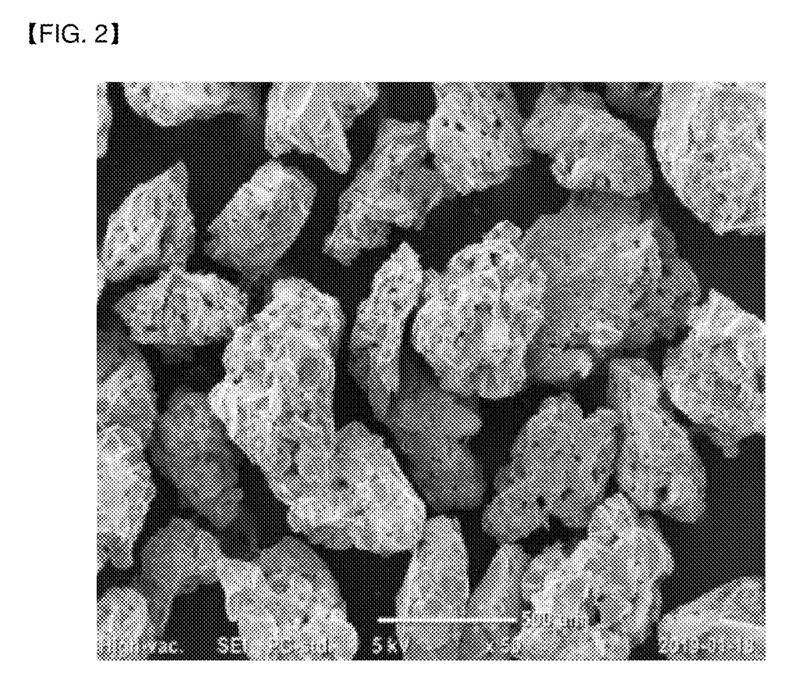
FIG. 2 is a photograph of the extruded fine reassembly prepared in Example 2 observed with a scanning electron microscope in Experimental Example 4.
Figure 3:
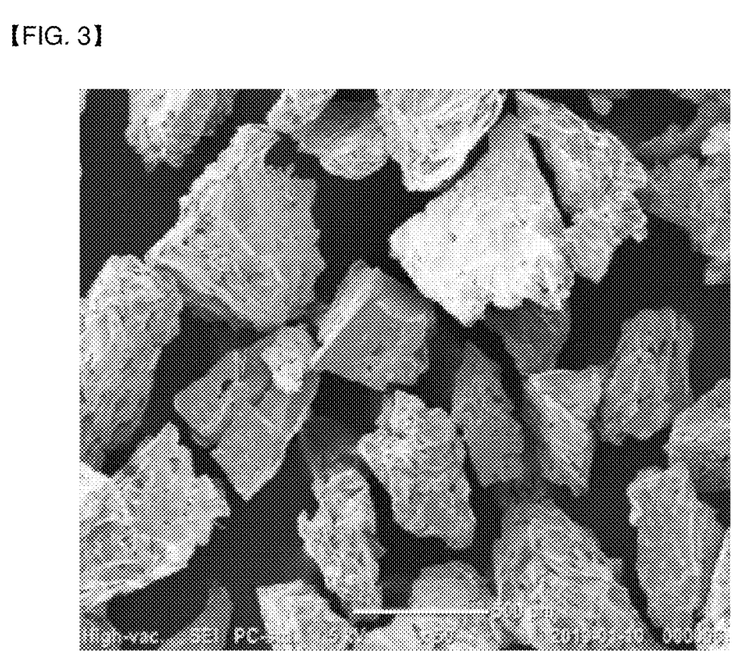
FIG. 3 is a photograph of the extruded fine reassembly prepared in Comparative Example 3 observed with a scanning electron microscope in Experimental Example 4.

The shape of the extruded fine reassemblies prepared in Example 2 and Comparative Example 3 was observed using a scanning electron microscope (SEM). The results are shown in FIGS. 2 and 3, respectively.

TABLE 3

| | Extruded fine reassembly | | | |
| --- | --- | --- | --- | --- |
| | Moisture content (wt %) | CRC (g/g) | Vortex (sec) | Generation amount of re-fines (wt %) |
| Example 1 | 4.4 | 49.1 | 47 | 13.5 |
| Example 2 | 4.5 | 48.6 | 45 | 16.8 |
| Example 3 | 1.9 | 31.1 | 37 | 15.9 |
| Example 4 | 2.2 | 49.6 | 38 | 17.0 |
| Comparative Example 1 | ND | ND | ND | ND |
| Comparative Example 2 | 4.9 | 49.7 | 44 | 11.3 |
| Comparative Example 3 | 4.4 | 48.9 | 45 | 12.4 |
| Comparative Example 4 | 3 | 49.2 | 43 | 14.1 |
| Comparative Example 5 | 3.7 | 48.7 | 46 | 13.4 |
| Comparative Example 6 | 3 | 47 | 38 | 12.1 |

TABLE 3-continued

|  | Extruded fine reassembly | | | |
|---|---|---|---|---|
|  | Moisture content (wt %) | CRC (g/g) | Vortex (sec) | Generation amount of re-fines (wt %) |
| Comparative Example 7 | 5.1 | 50.1 | 40 | 11.7 |
| Comparative Example 8 | 4.8 | 50.2 | 45 | 11.8 |
| Comparative Example 9 | 5.9 | 46.4 | 35 | 22.5 |
| Comparative Example 10 | 11 | 45.9 | 42 | 8.7 |
| Comparative Example 11 | 1.3 | 43.1 | 21 | 44.3 |
| Comparative Example 12 | 10 | 46 | 43 | 10.3 |
| Comparative Example 13 | 2.6 | 31.7 | 39 | 13 |

In Table 3, "ND" means not determined.

Referring to the result of the experiment, as water was added during the extrusion process, the reassembling strength was weakened and the generation amount of re-fines was increased. The extruded fine reassemblies of Examples 1 to 3 in which extrusion strength was controlled in this way exhibited a low moisture content compared to Comparative Examples prepared under the same conditions except that water was not added during the extrusion process. Accordingly, it is possible to shorten the processing time in the drying process for the extruded fine reassembly afterward, and to prevent problems in the pulverization and transport processes due to the low moisture content.

Meanwhile, in Comparative Example 1, a lump was formed inside the mixer during the process for forming the fine reassembly, and continuous operation was impossible, so the extruded fine reassembly and the super absorbent polymer were not manufactured.

In addition, as shown in FIGS. 2 and 3, as the extruded fine reassembly of Example 2 in which water was added in a controlled content during the preparation of the extruded fine reassembly had an appropriate level of reassembling strength, surface pores were observed. However, in Comparative Example 3 in which water was not added during the preparation of the extruded fine reassembly, almost no surface pores were observed. This result is because the reassembling strength was greatly increased in Comparative Example 3, as no water was added.

Experimental Example 5

The physical properties of the super absorbent polymers prepared in Examples and Comparative Examples were evaluated in the following manner, and the results are shown in Table 4.

(1) CRC (Centrifugal Retention Capacity)

The centrifuge retention capacity of the super absorbent polymers prepared in Examples and Comparative Examples was measured based on the EDANA WSP 241.3, as in the method for measuring the centrifuge retention capacity of the extruded fine reassembly.

Specifically, 0.2 g of a sample of the super absorbent polymer was placed in a tea bag and precipitated in 0.9% saline for 30 minutes. After dehydration for 3 minutes with a centrifugal force of 250G (gravity), the amount $W_2$ (g) of saline absorbed was measured. Further, after carrying out the same operation without using the extruded fine reassembly, the weight $W_1$ (g) at that time was measured.

Then, CRC (g/g) was calculated by using the obtained weight values according to the Equation 2.

(2) Absorption under Pressure (0.7AUP)

The absorption under pressure (AUP) of the super absorbent polymers of Examples and Comparative Examples was measured according to the EDANA (European Disposables and Nonwovens Association) WSP 242.3.

Specifically, a 400 mesh stainless steel screen was installed in a cylindrical bottom of a plastic having an inner diameter of 60 mm. $W_0$ (g, 0.90 g) of the polymer prepared in one of Examples and Comparative Examples was uniformly scattered on the screen at a temperature of 23±2° C. and a relative humidity of 45%. Thereafter, a piston which can uniformly provide a load of 0.7 psi was placed on the polymer. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 125 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One piece of filter paper having a diameter of 120 mm was placed thereon. After the measuring device was mounted on the filter paper, the liquid was absorbed for 1 hour under a load. After 1 hour, the measuring device was lifted, and the weight $W_4$ (g) was measured.

Then, 0.7AUP (g/g) was calculated by using the obtained weight values according to the following Equation 2.

$$0.7\text{AUP (g/g)}=[W_4 \text{ (g)}-W_3 \text{ (g)}]/W_0 \text{ (g)} \quad \text{[Equation 2]}$$

in Equation 2, $W_0$ (g) is an initial weight (g) of the super absorbent polymer, $W_3$ (g) is a sum of a weight of the super absorbent polymer and a weight of the device providing a load to the super absorbent polymer, and $W_4$ (g) is a sum of a weight of the super absorbent polymer and a weight of the device providing a load to the super absorbent polymer, after making the super absorbent polymer absorb the saline for 1 hour under a load (0.7 psi).

(3) Permeability

The permeability was measured by the method described in the literature (Buchholz, F. L. and Graham, A. T., "Modern Superabsorbent Polymer Technology," John Wiley & Sons (1998), page 161) under a load of 0.3 psi with 0.9% saline solution.

Specifically, 0.2 g of super absorbent polymer particles having a particle diameter of 300 to 600 μm (hereinafter, referred to as a sample) were taken from the super absorbent polymer prepared in Examples or Comparative Examples, and put into a cylinder (q 20 mm). At this time, one end of the cylinder includes a stopcock, and an upper limit line and a lower limit line are marked. The upper limit line of the cylinder is marked at the position when 40 mL of saline solution is filled, and the lower limit line is marked at the position when 20 mL of saline solution is filled.

50 g of 0.9% saline (NaCl) solution was added into the cylinder in which the stopcock was locked, and left for 30 minutes. If necessary, additional saline solution is added such that the level of the saline solution reaches the upper limit line of the cylinder.

A load of 0.3 psi was applied to the cylinder containing the saline-absorbing super absorbent polymer and allowed to stand for 1 minute. Thereafter, the stopcock located at the bottom of the cylinder was opened to measure the time taken for the 0.9% saline solution to pass from the upper limit line marked on the cylinder to the lower limit line. All measurements were carried out at a temperature of 24±1° C. and a relative humidity of 50±10%.

The time taken to pass from the upper limit line to the lower limit line was measured for each sample ($T_S$) and without the addition of the super absorbent polymer ($T_0$), and the permeability was calculated according to Equation 4 below.

Permeability (sec)=$T_S$-$T_0$        [Equation 4]

In Equation 4, $T_S$ (unit: seconds) means the time taken for 0.9% saline solution to permeate a saline-absorbing super absorbent polymer under a pressure of 0.3 psi, after preparing the saline-absorbing super absorbent polymer by swelling 0.2 g of a super absorbent polymer with 0.9% saline (NaCl) solution for 30 minutes. $T_0$ (unit: seconds) means the time taken for 0.9% saline solution to permeate under a pressure of 0.3 psi without the saline-absorbing superabsorbent polymer.

(4) Absorption Rate (Vortex)

The absorption rate (vortex time) was measured according to JIS K 7224. Specifically, it was calculated by adding 2 g of the super absorbent polymer to 50 mL of saline at 25° C., stirring a magnetic bar (8 mm in diameter and 30 mm in length) at 600 rpm, and measuring the time until vortex disappeared in seconds.

TABLE 4

| | Super absorbent polymer | | | |
|---|---|---|---|---|
| | CRC (g/g) | 0.7AUP (g/g) | Permeability (sec) | Vortex (sec) |
| Example 1 | 38.7 | 17.9 | 327 | 49 |
| Example 2 | 38.9 | 19 | 153 | 46 |
| Example 3 | 30 | 21 | 22 | 52 |
| Example 4 | 38.5 | 17.4 | 380 | 46 |
| Comparative Example 1 | ND | ND | ND | ND |
| Comparative Example 2 | 38.6 | 15.2 | 715 | 50 |
| Comparative Example 3 | 38.5 | 15.5 | 689 | 51 |
| Comparative Example 4 | 38.9 | 15.1 | 710 | 48 |
| Comparative Example 5 | 38.3 | 13.7 | 750 | 45 |
| Comparative Example 6 | 40.5 | 14 | 339 | 40 |
| Comparative Example 7 | 39.5 | 14.1 | 653 | 40 |
| Comparative Example 8 | 37.1 | 14.3 | 647 | 45 |
| Comparative Example 9 | 37.5 | 17.5 | 149 | 44 |
| Comparative Example 10 | 33.4 | 8.9 | 1085 | 32 |
| Comparative Example 11 | 32.1 | 11.4 | 520 | 40 |
| Comparative Example 12 | 34 | 11 | 890 | 43 |
| Comparative Example 13 | 29.6 | 20.4 | 64 | 55 |

In Table 4, "ND" means not determined.

Referring to the result of the experiment, in Examples 1 to 4 in which the extrusion strength was controlled by adding water during the extrusion process for preparing the extruded fine reassembly, as the drying efficiency of the extruded fine reassembly improved, the finally prepared super absorbent polymer exhibited excellent absorption performance, particularly excellent absorption under pressure and permeability.

On the other hand, in the case of the super absorbent polymer prepared according to Comparative Example 9, the absorption performance was comparable to that of Examples, but the content of re-fines generated during the preparation of the extruded fine reassembly was significantly higher than that of Examples (see Table 3). Considering this, it can be seen that Examples 1 to 4 prepared by the preparation method according to the present disclosure have better processability.

The invention claimed is:

1. A method for preparing a super absorbent polymer, comprising:
   preparing a hydrogel polymer by polymerizing a monomer composition comprising a water-soluble ethylene-based unsaturated monomer having at least partially neutralized acidic groups and a polymerization initiator;
   drying and pulverizing the hydrogel polymer, and performing classification into fines having a particle diameter of less than 150 μm and normal particles having a particle diameter of 150 to 850 μm;
   preparing a fine reassembly by mixing the fines with water and a polycarboxylic acid-based copolymer, followed by reassembling;
   preparing an extruded fine reassembly by extruding the fine reassembly while adding water, followed by drying, pulverization and classification; and
   mixing the extruded fine reassembly with the normal particles, and then performing a surface cross-linking reaction by adding a surface cross-linking agent;
   wherein 30 to 80 parts by weight of water are used based on 100 parts by weight of the fines in the preparation of the fine reassembly, and
   15 to 30 parts by weight of water are used based on the fine reassembly in the preparation of the extruded fine reassembly,
   wherein the polycarboxylic acid-based copolymer is a copolymer comprising at least one of a repeating unit represented by the following Chemical Formula 1-a or a repeating unit represented by the following Chemical Formula 1-b:

[Chemical Formula 1-a]

[Chemical Formula 1-b]

wherein, in Chemical Formulae 1-a and 1-b,
$R^1$, $R^2$ and $R^3$ are each independently hydrogen or a C1 to C6 alkyl group,
RO is a C2 to C4 oxyalkylene group, M¹ is hydrogen, or a monovalent metal or non-metal ion,
X is —COO—, a C1 to C5 alkyloxy group, or a C1 to C5 alkyldioxy group,
m is an integer of 1 to 100,
n is an integer of 1 to 1000, and
p is an integer of 1 to 150, and when p is 2 or more, two or more repeating —RO— are the same as or different from each other.

2. The method for preparing a super absorbent polymer of claim 1,
wherein a total amount of water used in the preparation of the fine reassembly and the extruded fine reassembly is smaller than a total weight of the fines used in the preparation of the fine reassembly.

3. The method for preparing a super absorbent polymer of claim 1,
wherein the polycarboxylic acid-based copolymer is a copolymer comprising a repeating unit derived from methoxy polyethylene glycol monomethacrylate and a repeating unit derived from (meth)acrylic acid.

4. The method for preparing a super absorbent polymer of claim 1,
wherein the polycarboxylic acid-based copolymer has a weight average molecular weight of 500 to 1,000,000 g/mol.

5. The method for preparing a super absorbent polymer of claim 1,
wherein the polycarboxylic acid-based copolymer is added in an amount of 0.01 to 5 parts by weight based on 100 parts by weight of the fines.

6. The method for preparing a super absorbent polymer of claim 1,
wherein the mixing of the fines with water and the polycarboxylic acid-based copolymer is performed at a mixing speed of 300 to 2000 rpm.

7. The method for preparing a super absorbent polymer of claim 1,
wherein the extrusion is performed at a speed of 80 to 150 rpm using an extruder provided with an outlet having a hole diameter of 10 to 20 mm.

8. The method for preparing a super absorbent polymer of claim 1,
wherein the drying is performed at a temperature of 120 to 220° C. for 30 to 120 minutes in the preparation of the extruded fine reassembly.

9. The method for preparing a super absorbent polymer of claim 1,
wherein an amount of re-fines having a particle diameter of less than 150 μm based on a total weight of the extruded fine reassembly is 20 wt % or less in the preparation of the extruded fine reassembly.

10. The method for preparing a super absorbent polymer of claim 1,
wherein the extruded fine reassembly satisfies the following conditions of a1) to a3):
a1) moisture content: 1 to 5 wt % based on a total weight of the extruded fine reassembly,
a2) centrifuge retention capacity measured according to EDANA WSP 241.3:30 to 50 g/g, and
a3) absorption rate according to JIS K 7224:30 to 50 seconds.

11. The method for preparing a super absorbent polymer of claim 1,
wherein the extruded fine reassembly and the normal particles are mixed in a weight ratio of 10:90 to 90:10.

12. The method for preparing a super absorbent polymer of claim 1,
wherein the super absorbent polymer satisfies the following conditions of b1) to b4):
b1) centrifuge retention capacity measured according to EDANA WSP 241.3:30 to 40 g/g,
b2) absorption under pressure of the super absorbent polymer to 0.9 wt % aqueous solution of sodium chloride at 0.7 psi for 1 hour measured according to EDANA WSP 242.3:17 to 25 g/g;
b3) permeability: 20 to 400 seconds, and
b4) absorption rate according to JIS K 7224:40 to 60 seconds.

* * * * *